US009886456B2

(12) United States Patent
Naemura et al.

(10) Patent No.: US 9,886,456 B2
(45) Date of Patent: Feb. 6, 2018

(54) TIME-SERIES DATA ACCUMULATION DEVICE

(71) Applicants: Kabushiki Kaisha Toshiba, Minato-ku (JP); Toshiba Solutions Corporation, Kawasaki-shi (JP)

(72) Inventors: Kenjiro Naemura, Mitaka (JP); Masataka Yamada, Fuchu (JP); Yuuki Matsuoka, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 312 days.

(21) Appl. No.: 14/662,723

(22) Filed: Mar. 19, 2015

(65) Prior Publication Data

US 2015/0193475 A1    Jul. 9, 2015

Related U.S. Application Data

(63) Continuation of application No. PCT/JP2012/073916, filed on Sep. 19, 2012.

(51) Int. Cl.
*G06F 17/00* (2006.01)
*G06F 17/30* (2006.01)
*G06F 17/18* (2006.01)

(52) U.S. Cl.
CPC ........ *G06F 17/30289* (2013.01); *G06F 17/18* (2013.01); *G06F 17/30551* (2013.01)

(58) Field of Classification Search
CPC .. G06F 11/3409; G06F 11/3452; G06F 17/18; G06F 2201/81; G06F 11/008
See application file for complete search history.

(56) References Cited

U.S. PATENT DOCUMENTS

| | | | |
|---|---|---|---|
| 6,381,554 B1 * | 4/2002 | Matsuo ................ | G05B 13/026 702/174 |
| 7,962,610 B2 * | 6/2011 | Lippincott ........ | G06F 17/30581 702/74 |
| 7,979,439 B1 * | 7/2011 | Nordstrom ........ | G06F 17/30312 707/741 |

FOREIGN PATENT DOCUMENTS

| | | |
|---|---|---|
| CN | 102446184 A | 5/2012 |
| CN | 102495851 A | 6/2012 |

(Continued)

OTHER PUBLICATIONS

International Search Report dated Dec. 18, 2012 for PCT/JP2012/073916 filed on Sep. 19, 2012 with English Translation.

(Continued)

*Primary Examiner* — Angelica Ruiz
(74) *Attorney, Agent, or Firm* — Oblon, McClelland, Maier & Neustadt, L.L.P.

(57) ABSTRACT

A storage unit of a time-series data accumulation device of an embodiment stores statistical value data. A determination unit determines an interval function on the basis of data capacity, and a total amount of time elapsed from the beginning of measurement of a time-series data. A first calculation unit calculates an interval indicating an amount of time required to measure all the time-series data items constituting desired statistical value data on the basis of the determined interval function. A second calculation unit acquires all the time-series data items on the basis of the calculated interval, and thereafter calculates the statistical value on the basis of all the acquired time-series data items. A write unit writes the calculated statistical value to the storage unit as the statistical value data.

6 Claims, 8 Drawing Sheets

(56) References Cited

FOREIGN PATENT DOCUMENTS

| JP | 5-68038 A | 3/1993 |
|----|-----------|--------|
| JP | 9-185534 A | 7/1997 |
| JP | 2002-183216 A | 6/2002 |
| JP | 2008-185540 A | 8/2008 |
| JP | 2012-168815 A | 9/2012 |
| WO | WO 2011/142026 A1 | 11/2011 |

OTHER PUBLICATIONS

International Written Opinion dated Dec. 18, 2012 for PCT/JP2012/073916 filed on Sep. 19, 2012.
Combined Chinese Office Action and Search Report dated Apr. 26, 2017 in Patent Application No. 201280075863.4 (with English Translation of Category of Cited Documents).
Li Hai-Iin et al., "Time Series Mining Based on Piecewise Aggregate Time Warping Distance", Journal of Shandong University (Engineering Science), vol. 41, No. 5, Oct. 2011, pp. 57-62 (with English Abstracts and English Translation).
Xie Fu-ding et al., "Method of Time Series Piecewise Linear Representation Based on the Function", Computer Science, vol. 38, No. 11, Nov. 2011, pp. 153-155 (with English Abstracts and English Translation).
International Preliminary Report on Patentability and Written Opinion dated Apr. 2, 2015 in PCT/JP2012/073916 (submitting English translation only).

* cited by examiner

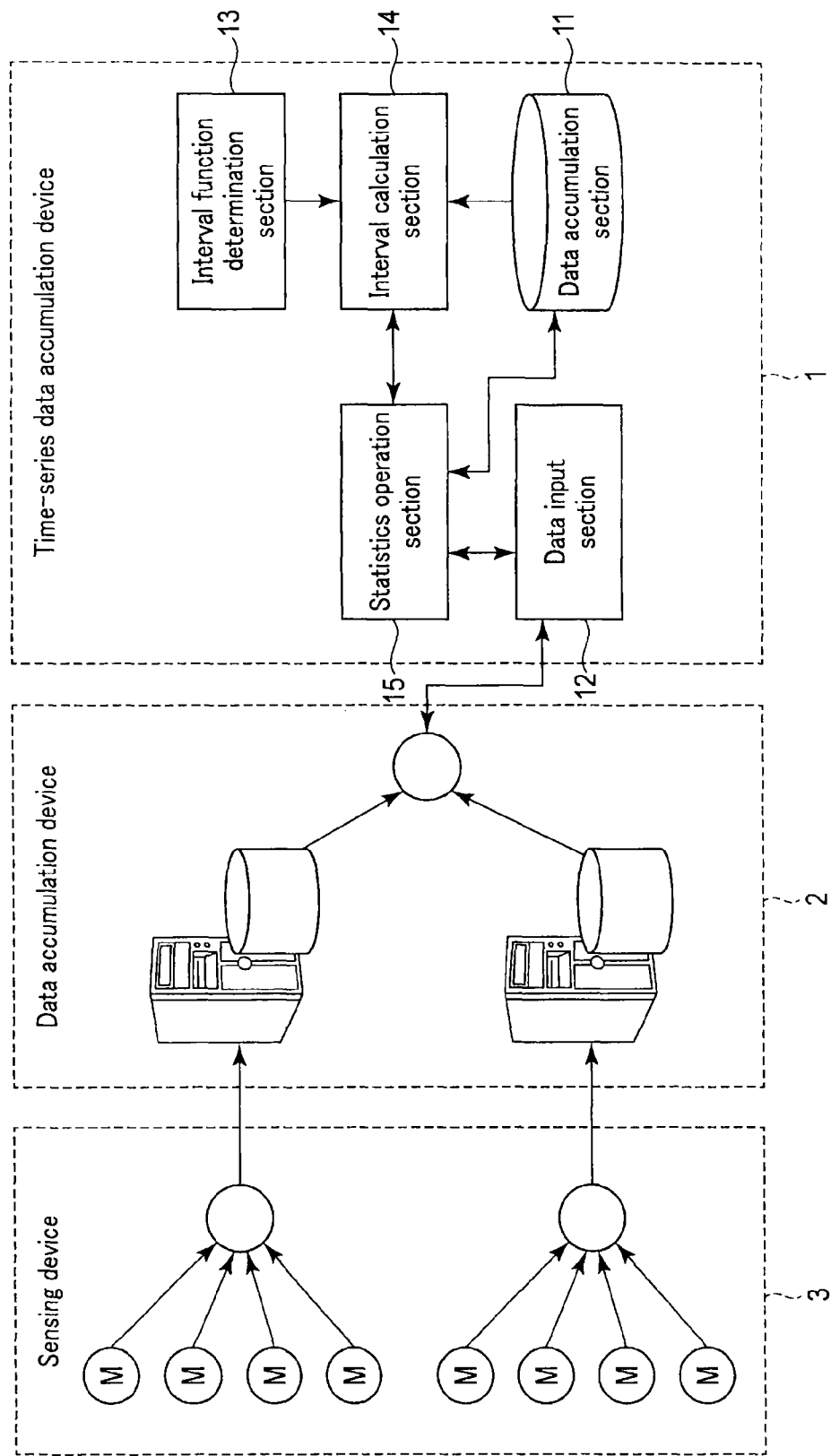
F I G. 2

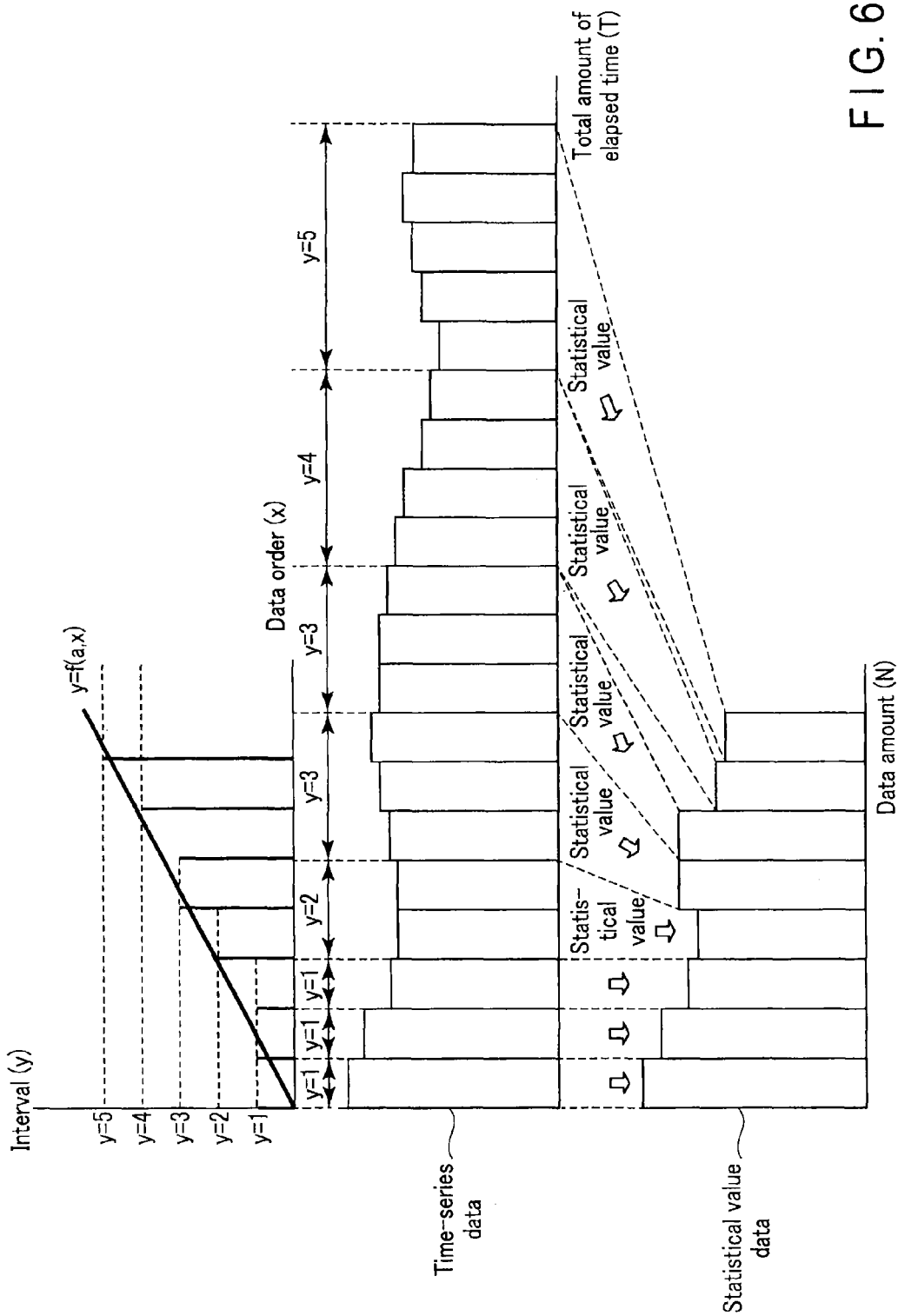
F I G. 6

TIME-SERIES DATA ACCUMULATION DEVICE

CROSS-REFERENCE TO RELATED APPLICATIONS

This is a Continuation application of PCT application No. PCT/JP2012/073916, filed on Sep. 19, 2012, which was published under PCT Article 21(2) in Japanese.

FIELD

Embodiments of the present invention relate to a time-series data accumulation device.

BACKGROUND

In general, when data analysis is executed by using a database appropriate for high-speed processing, and having a small capacity (for example, an in-memory database), analysis is executed by importing data necessary for data analysis from another database having a large capacity. In this case, there is the inconvenience of having to import data necessary for data analysis again when a data item different from the data item for which data analysis has already been executed is to be analyzed.

Further, when data (for example, meter data) to be periodically measured by a sensor is accumulated in a database having limited capacity, old data regarding which a fixed period of time has passed from acquisition of the data is moved to another database (for example, a tape device which is used for processing of a lower speed, and is low in price). In this case, there is the inconvenience of, when reference to the old data is desired, having to restore the old data from the tape device to the in-memory database.

In consideration of the inconveniences described above, there is a technique for accumulating necessary data in a database of fixed capacity by defining a significance threshold increasing with an elapse of time, and significance of data to be accumulated in a database by using a function of elapsed time, and storing only data items corresponding to a value greater than or equal to the significance threshold.

However, in the technique described above, there is the inconvenience of losing old data lower than the significance threshold by deletion with the passage of time, and thus there is the inconvenience of being unable to execute data analysis in which an influence of old data is taken into consideration.

A technical problem of the present invention is to provide a time-series data accumulation device capable of accumulating data in a form in which data analysis taking an influence of old data into consideration without deleting old data can be executed.

BRIEF DESCRIPTION OF THE DRAWINGS

FIG. 2 is a schematic view showing a configuration example of a time-series data accumulation system including the time-series data accumulation device according to the first embodiment.

FIG. 6 is a schematic view showing an outline of time-series data accumulation processing to be carried out by using a time-series data accumulation device according to a modification example of the first embodiment.

DETAILED DESCRIPTION

In general, according to one embodiment, a time-series data accumulation device comprises a storage unit, a determination unit, a first calculation unit, a second calculation unit, and a write unit.

The storage unit stores therein statistical value data indicating a statistical value of time-series data indicating data varying with time.

The determination unit determines an interval function on the basis of data capacity indicating a data amount which can be written to the storage unit, and a total amount of time elapsed from the beginning of measurement of the time-series data carried out by an external device configured to measure the time-series data.

The first calculation unit calculates an interval indicating an amount of time required by the external device to measure all the time-series data items constituting desired statistical value data on the basis of the determined interval function.

The second calculation unit acquires all the time-series data items constituting the desired statistical value data from the external device on the basis of the calculated interval, and thereafter calculates the statistical value on the basis of all the acquired time-series data items.

The write unit writes the calculated statistical value to the storage unit as the statistical value data.

[First Embodiment]

Figure 1:
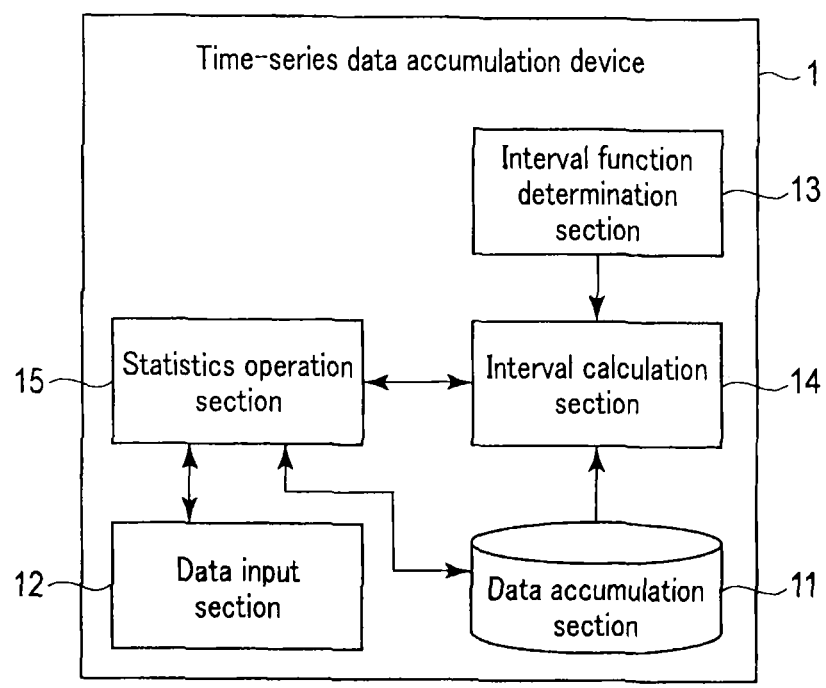
FIG. 1 is a schematic view showing a configuration example of a time-series data accumulation device according to a first embodiment.
Figure 3:
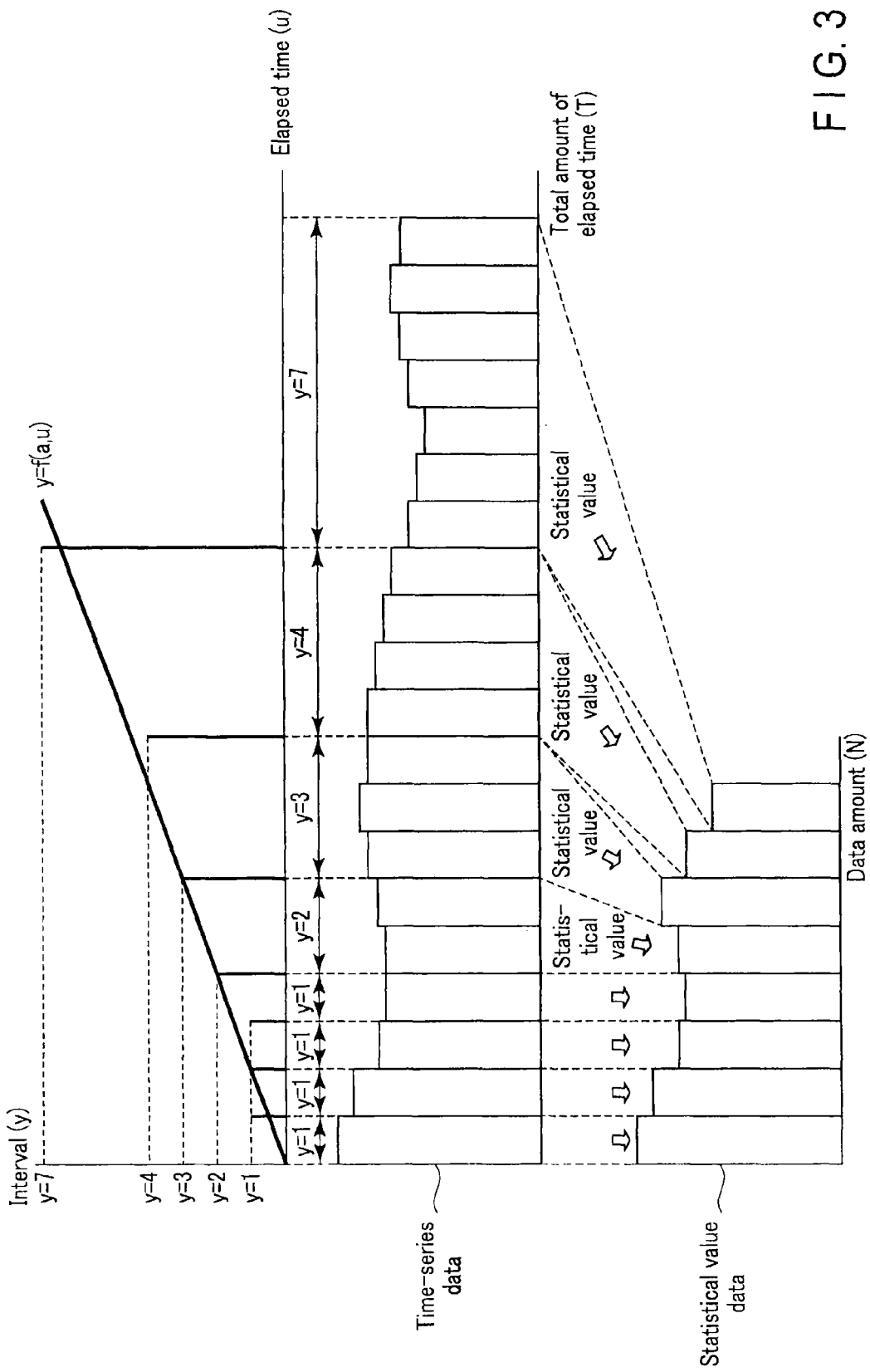
FIG. 3 is a schematic view showing an outline of time-series data accumulation processing to be carried out by using the time-series data accumulation device according to the first embodiment.

FIG. 1 is a schematic view showing a configuration example of a time-series data accumulation device according to a first embodiment, FIG. 2 is a schematic view showing a configuration example of a time-series data accumulation system including the time-series data accumulation device according to the first embodiment, and FIG. 3 is a schematic view showing an outline of time-series data accumulation processing to be carried out by using the time-series data accumulation device according to the first embodiment. The time-series data accumulation device 1 shown in FIG. 1 is provided with a data accumulation section 11, data input section 12, interval function determination section 13, interval calculation section 14, and statistics operation section 15.

The data accumulation section 11 is a section from/to which data can be read/written by the statistics operation section 15 to be described later, and is a storage device configured to store therein time-series data stored in a data accumulation device 2 shown in FIG. 2 as statistical value data. The time-series data implies data varying with time and, as an example, meter data to be acquired at regular time intervals by a sensing device 3 shown in FIG. 2 can be mentioned. Further, the statistical value data implies data indicating a statistical value (for example, a mean value, median, p-quartile, mode, minimum value, maximum value, and the like) of one or a plurality of time-series data items.

The data input section 12 has a function of acquiring desired time-series data from the data accumulation device 2 in accordance with a data acquisition request sent from the statistics operation section 15 to be described later, and sending the acquired time-series data to the statistics operation section 15.

The interval function determination section 13 has a function of calculating a variable a on the basis of the formula (1) shown below, data capacity N indicating a data amount which can be written to the data accumulation section 11, and total amount of time T elapsed from the time at which measurement of the time-series data has been started by the sensing device 3 to thereby determine an interval function. It should be noted that the variable a is a value indicating a gradient of a linear function shown in FIG. 3. Further, the variable u (hereinafter written as the elapsed time u) is a value indicating an elapsed time required from the start of measurement of time-series data carried out by the sensing device 3 to the completion of measurement of the desired time-series data.

$$N = \int_0^T \frac{1}{f(a, u)} du \qquad (1)$$

The interval function determination section 13 has a function of, immediately after determination of the interval function, sending interval function information indicating the determined interval function to the interval calculation section 14.

The interval calculation section 14 has a function of, immediately after acceptance of input of the interval function information sent from the interval function determination section 13, setting a variable x (hereinafter written as an order x) indicating the order in which statistical value data items are to be stored in the data accumulation section 11, and the elapsed time u to initial values. It should be noted that, in this embodiment, both the initial values of the order x, and elapsed time are 0. Further, the interval calculation section 14 has a function of calculating an amount of time (hereinafter written as an interval y) required to measure all the time-series data items constituting the desired statistical data on the basis of the interval function indicated by the interval function information the input of which has been accepted, and elapsed time u. It should be noted that the interval y is calculated by taking first and second conditions set in advance into consideration. The first condition is a condition to be taken into consideration more preferentially than the second condition, and is, for example, a condition that the calculated value of y is to be rounded up, or is to be rounded off to the nearest integer. Further, the second condition is a condition to be further taken into consideration after the first condition has been taken into consideration, and is, for example, a condition that (i) the value is to be made an integer value greater than or equal to 1, (ii) the value is to be made an integer value of 2 to the power of N, or (iii) the value is made an integer value giving a good place to leave off such as a second, minute, hour, day, week, month, year, and the like. It should be noted that by using the condition of (ii) as the second condition, it becomes possible to easily calculate a statistical value (mean value) in the statistics operation section 15 to be described later. Further, by using the condition of (iii) as the second condition, it becomes possible to easily calculate a statistical value necessary for analysis in the statistics operation section 15 to be described later. The first and second conditions are not limited to the above-mentioned conditions, and can be appropriately added by the user through an input interface not shown.

Further, the interval calculation section 14 has a function of, immediately after calculation of the interval y, sending interval information indicating the calculated interval y to the statistics operation section 15.

The statistics operation section 15 has a function of, immediately after acceptance of input of the interval information sent from the interval calculation section 14, sending a data acquisition request requesting to send time-series data of an amount of time elapsed from u to u+y to the data input section 12 on the basis of an interval y indicated by the interval information the input of which has been accepted. Further, the statistics operation section 15 has a function of, immediately after acceptance of input of the time-series data sent from the data input section 12 in accordance with the data acquisition request, calculating a statistical value of the time-series data the input of which has been accepted. Furthermore, the statistics operation section 15 has a function of writing the calculated statistical value to the data accumulation section 11 as statistical value data of the order x.

Next, an example of an operation of the time-series data accumulation device 1 constituted as described above will be described below with reference to the flowchart of FIG. 4. However, it is assumed here that the first condition is the condition "that the calculated value of y is to be rounded off to the nearest integer", and the second condition is the condition "that (i) the value is to be made an integer value greater than or equal to 1".

In the beginning, the interval function determination section 13 calculates the variable a on the basis of formula (1) described above, data capacity N, and total amount of the elapsed time T, and determines (calculates) an interval function (step S1).

It should be noted that the interval function information indicating the interval function calculated in step S1 is sent to the interval calculation section 14 by the interval function determination section 13.

Subsequently, upon acceptance of input of the interval function information sent from the interval function determination section 13, the interval calculation section 14 sets the order x and the elapsed time u to initial values (step S2). More specifically, the interval calculation section 14 sets both the order x and the elapsed time u to 0.

Next, the interval calculation section 14 calculates the interval y on the basis of the interval function indicated by the interval function information the input of which has been accepted in step S2, and elapsed time u (step S3). It should be noted that the interval calculation section 14 calculates the interval y in which the first and second conditions are taken into consideration by rounding off the calculated value of the interval y to the nearest integer, and thereafter making the rounded-off value an integer value greater than or equal to 1 on the basis of the first and second conditions.

It should be noted that the interval information indicating the interval y calculated in step S3 is sent to the statistics operation section 15 by the interval calculation section 14.

Subsequently, upon acceptance of input of the interval information sent from the interval calculation section 14, the statistics operation section 15 sends a data acquisition request requesting to send time-series data of an amount of time elapsed from u to u+y to the data input section 12 on the basis of an interval y indicated by the interval information the input of which has been accepted. Upon acceptance of input of the data acquisition request sent from the statistics operation section 15, the data input section 12 acquires the time-series data of the time elapsed from u to u+y from the data accumulation device 2, and sends the acquired time-series data to the statistics operation section 15. Thereafter, the statistics operation section 15 accepts input of the time-series data of the time elapsed from u to u+y sent from the data input section 12 (step S4).

Next, the statistics operation section 15 calculates a statistical value on the basis of the time-series data the input of which has been accepted in step S4 (step S5).

Subsequently, the statistics operation section 15 writes the statistical value calculated in step S5 to the data accumulation section 11 as statistical value data of the order x (step S6).

It should be noted that immediately after writing the statistical value data to the data accumulation section 11 in step S6, the statistics operation section 15 sends write notification information indicating that the statistical value data has been written to the data accumulation section 11 to the interval calculation section 14.

Next, upon acceptance of input of the write notification information sent from the statistics operation section 15, the interval calculation section 14 adds 1 to the order x, and adds y calculated in step S3 to the elapsed time u. Then, the interval calculation section 14 sets the order x to the new value x+1, and sets the elapsed time u to the new value u+y (step S7).

Subsequently, the interval calculation section 14 determines whether the new value of the order x set in step 7 is greater than or equal to N, or the new value is smaller than N (step S8).

It should be noted that when the result of the determination in step S8 indicates that the new value is smaller than N (x<N in step S8), the flow is returned to the processing of step S3. Further, when the result of the determination in step S8 indicates that the new value is greater than or equal to N (x≥N in step S8), the operation in the time-series data accumulation device 1 is terminated.

According to the first embodiment described above, by the configuration in which the interval function determination section 13 configured to determine an interval function on the basis of formula (1), the interval calculation section 14 configured to calculate an interval y of the desired time-series data on the basis of the interval function determined by the interval function determination section 13, and elapsed time u, and the statistics operation section 15 configured to calculate a statistical value by using the time-series data acquired on the basis of the interval calculated by the interval calculation section 14, and thereafter write the calculated statistical value to data accumulation section 11 as the statistical value data are provided, it is possible to store statistical value data of an arbitrary elapsed time in a storage medium of fixed capacity.

Further, the interval function to be determined by the interval function determination section 13 is defined by a linear function of u, whereby it is possible, when the statistical value data stored in the data accumulation section 11 is depicted as a graph which can be displayed in an enlarged manner, to display the maximum sampling interval with a fixed ratio of a thereof to the sampling period kept as it is.

Hereinafter, a modification example of the first embodiment will be described.

[Modification Example]

Here, the case where the formula used by the interval function determination section 13 is not formula (1) described above, but formula (2) shown below will be described.

Hereinafter, only functions different from the aforementioned first embodiment will be described.

The interval function determination section 13 has a function of calculating a variable a on the basis of formula (2) shown below, data capacity N, and total amount of elapsed time T to thereby determine an interval function. It should be noted that the variable a is a value indicating a gradient of a linear function shown in FIG. 6.

$$T=\int_0^N f(a,x)dx \qquad (2)$$

Further, the interval calculation section 14 has a function of calculating an interval y on the basis of an interval function indicated by the interval function information determined by the interval function determination section 13, and order x.

Figure 4:
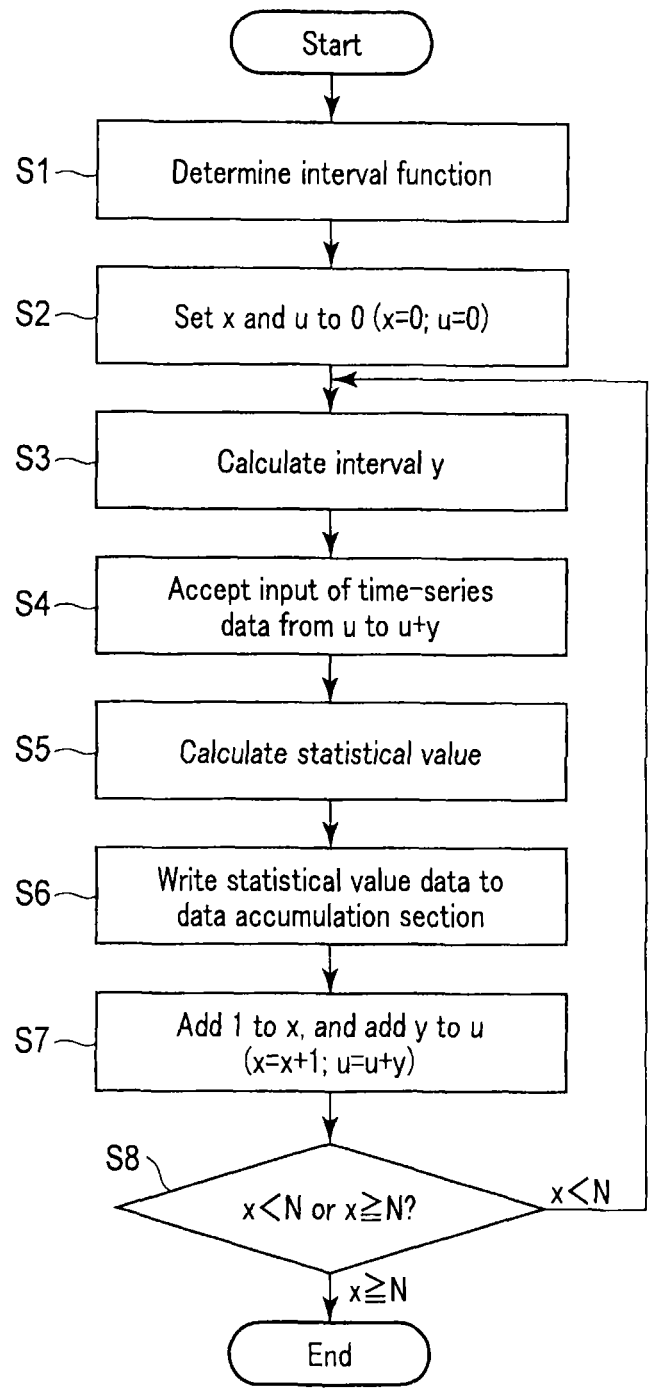
FIG. 4 is a flowchart showing an example of an operation of the time-series data accumulation device according to the first embodiment.
Figure 5:
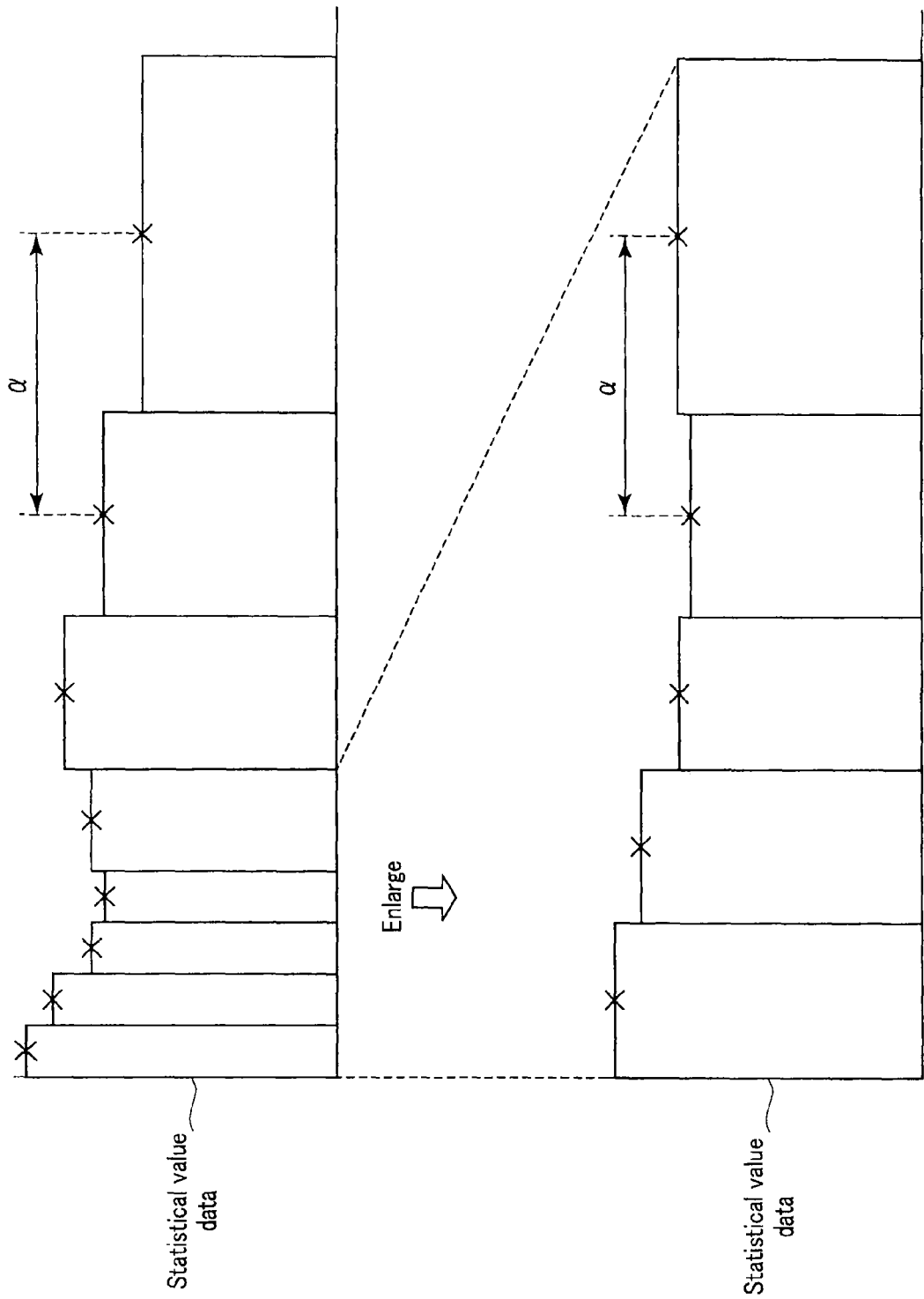
FIG. 5 is a schematic view showing an example of statistical data stored in the time-series data accumulation device according to the first embodiment.

It should be noted that the operation example of the time-series data accumulation device 1 of this modification example is identical to the processing of steps S1 to S8 described by using aforementioned FIG. 4 except that formula (2) is used in the processing of step S1, and that the interval y is calculated on the basis of the interval function, and order x in the processing of step S3, and hence a detailed description thereof is omitted here.

According to the above-mentioned modification example of the first embodiment, even by the configuration in which the interval function determination section 13 has a function of determining an interval function on the basis of formula (2) described above, and the interval calculation section 14 has a function of calculating an interval y of the desired time-series data on the basis of the interval function, and order x, it is possible, as in the case of the aforementioned first embodiment, to store statistical value data of an arbitrary elapsed time in a storage medium of fixed capacity.

[Second Embodiment]

Figure 7:
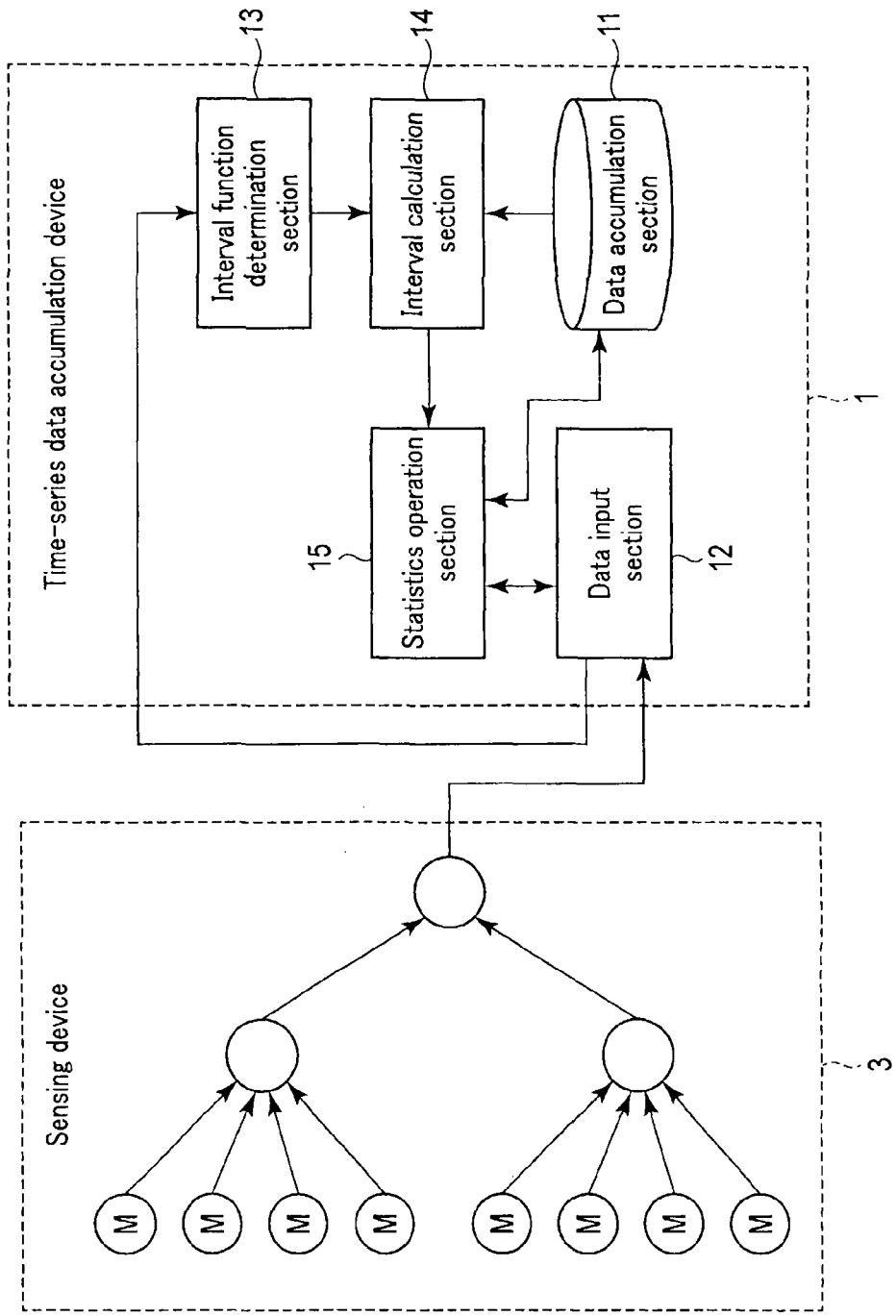
FIG. 7 is a schematic view showing a configuration example of a time-series data accumulation system including a time-series data accumulation device according to a second embodiment.

FIG. 7 is a schematic view showing a configuration example of a time-series data accumulation system including a time-series data accumulation device according to a second embodiment. It should be noted that a case is assumed in the second embodiment where statistical value data is stored in a data accumulation section 11 in a time-series data accumulation device 1 up to the full capacity of the data accumulation section 11, and furthermore, new statistical value data is stored in the data accumulation section 11.

Hereinafter, only functions different from the aforementioned first embodiment will be described.

The data accumulation section 11 is, like the aforementioned first embodiment, a storage device configured to store therein statistical value data. However, it is assumed that the data accumulation section 11 of this embodiment stores therein statistical value data indicating the statistical value in a state where the elapsed time U, and interval Y used when the desired statistical value is calculated (that is, the parameters used when the desired statistical value is calculated) are recognizable.

A data input section 12 has a function of, immediately after acceptance of input of time-series data sent from a sensing device 3 shown in FIG. 7 (that is, unlike the aforementioned first embodiment, time-series data is consecutively sent from an external device even without sending a data acquisition request to the external device), sending input acceptance notification information indicating that input of the time-series data has been accepted to an interval function determination section 13. Further, the data input section 12 has a function of writing the time-series data the input of which has been accepted to the data accumulation section 11 as statistical value data.

The interval function determination section 13 has a function of, immediately after acceptance of input of the input acceptance notification information sent from the data input section 12, determining an interval function like the aforementioned first embodiment.

An interval calculation section 14 has a function of, immediately after acceptance of input of interval function information sent from the interval function determination section 13, setting an order x to an initial value like the aforementioned first embodiment. However, in this embodiment, the initial value of the order x is N. Further, the interval calculation section 14 has a function of acquiring the elapsed time U, and interval Y used when the statistical value indicated by the statistical value data of the order x is calculated from the data accumulation section 11. Furthermore, the interval calculation section 14 has a function of calculating an interval y on the basis of the interval function indicated by the interval function information the input of which has been accepted, and acquired elapsed time U. It should be noted that the interval y is calculated by taking the first and second conditions set in advance into consideration.

A statistics operation section 15 has a function of, when a desired condition is satisfied, acquiring statistical value data of the order x, and statistical value data of the order x+1 (that is, statistical value data older than the statistical value data of the order x) from the data accumulation section 11. Further, the statistics operation section 15 has a function of calculating a new statistical value on the basis of the statistical value indicated by the acquired statistical value data of the order x, and statistical value indicated by the acquired statistical value data of the order x+1.

Here, an example of an operation of the time-series data accumulation device 1 according to this embodiment will be described with reference to the flowchart of FIG. 8.

First, upon acceptance of input acceptance notification information indicating that the data input section 12 has accepted input of new time-series data measured by the sensing device 3, the interval function determination section 13 calculates a variable a on the basis of formula (1) shown in the aforementioned first embodiment, data capacity N, and total amount of the elapsed time T, and determines (calculates) a new interval function (that is, the interval function determination section 13 calculates an interval function different from the interval function used when the statistical value data has been stored in the data accumulation section 11 up to the full capacity thereof) (step S11).

It should be noted that the interval function information indicating the interval function calculated in step S11 is sent to the interval calculation section 14 by the interval function determination section 13.

Subsequently, upon acceptance of input of the interval function information sent from the interval function determination section 13, the interval calculation section 14 sets the order x to an initial value (step S12). In this case, the interval calculation section 14 sets the order x to N.

Next, the interval calculation section 14 acquires the elapsed time U, and interval Y used when the statistical value indicated by the statistical value data of the order x (=N) is calculated from the data accumulation section 11 (step S13).

Subsequently, the interval calculation section 14 calculates a new interval y on the basis of the new interval function indicated by the interval function information the input of which has been accepted in step S12, and elapsed time U (step S14).

Next, the interval calculation section 14 subtracts 1 from the order x (=N) (step S15).

Subsequently, the interval calculation section 14 compares the interval Y acquired in step S13, and new interval y calculated in step S14 with each other to determine whether the value of Y is greater than or equal to the value of y, or the value of Y is smaller than the value of y (step S16). It should be noted that when the result of the determination of step S16 indicates that the value of Y is greater than or equal to the value of y (Y≥y in step S16), the flow is returned to the processing of step S13, i.e., the processing of steps S13 to S16 is executed again by using the value obtained in step S15 by subtracting 1 from the order x (=N) as the new order x.

When the result of the determination of step S16 indicates that the value of Y is smaller than the value of y (Y<y in step S16), the statistics operation section 15 acquires the statistical value data of the order x, and statistical value data of the order x+1 from the data accumulation section 11 (step S17).

Subsequently, the statistics operation section 15 calculates a new statistical value on the basis of the statistical value indicated by the two statistical value data items acquired in step S17 (step S18).

Next, the statistics operation section 15 writes the new statistical value calculated in step S18 to the data accumulation section 11 as statistical value data of the order x (step S19).

It should be noted that immediately after writing the new statistical value data to the data accumulation section 11 in step S19, the statistics operation section 15 sends write notification information indicating that the statistical value data has been written to the data accumulation section 11 to the data input section 12.

Thereafter, upon acceptance of input of the write notification information sent from the statistics operation section 15, the data input section 12 writes new time-series data which has been sent from the sensing device 3, and input of which has been accepted to the data accumulation section 11 as statistical value data of the order 0 (step S20), and the operation in the time-series data accumulation device 1 is terminated.

According to the second embodiment which has been described above, by the configuration in which the statistics operation section 15 having a function of calculating new statistical value data on the basis of the statistical value data of the order x, and statistical value data of the order x+1, and making the data accumulation section 11 have redundant capacity allowing the new time-series data to be further written as statistical value data is provided, it is possible to store consecutively occurring and gradually increasing time-series data in a storage medium of fixed capacity as statistical value data.

Hereinafter, a modification example of the second embodiment will be described.

[Modification Example]

Here, the case where the formula used by the interval function determination section 13 is not formula (1) described above, but formula (2) shown in the modification example of the aforementioned first embodiment will be described.

Hereinafter, only functions different from the aforementioned second embodiment will be described.

The interval function determination section 13 has a function of calculating a variable a on the basis of formula (2) described above, data capacity N, and total amount of elapsed time T to thereby determine an interval function.

Further, the interval calculation section 14 has a function of acquiring only the interval Y used when the statistical value indicated by the statistical value data of the order x from the data accumulation section 11. Furthermore, the interval calculation section 14 has a function of calculating an interval y on the basis of the interval function indicated by the interval function information determined by the interval function determination section 13, and order x.

Figure 8:
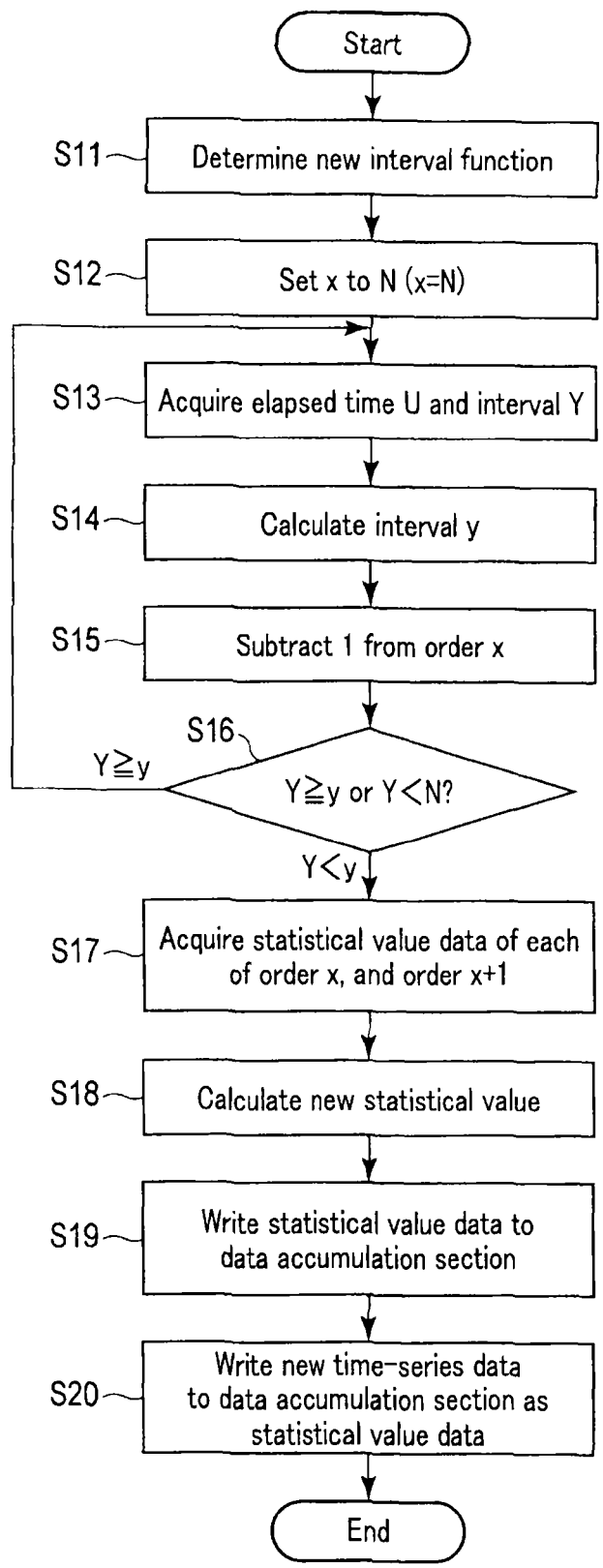
FIG. 8 is a flowchart showing an example of an operation of the time-series data accumulation device according to the second embodiment.

It should be noted that the operation example of the time-series data accumulation device 1 of this modification example is identical to the processing of steps S11 to S20 described by using aforementioned FIG. 8 except that formula (2) is used in the processing of step S11, that only the interval Y used when the statistical value indicated by the statistical value data of the order x is calculated is acquired in the processing of step S13, and that the interval y is calculated on the basis of the interval function, and order x in the processing of step S14, and hence a detailed description thereof is omitted here.

According to the above-mentioned modification example of the second embodiment, even by the configuration in which the interval function determination section 13 has a function of determining an interval function on the basis of formula (2) described above, and the interval calculation section 14 has a function of acquiring only the interval Y from the data accumulation section 11, and calculating an interval y of the desired time-series data on the basis of the interval function, and order x, it is possible, as in the case of the aforementioned second embodiment, to store consecutively occurring and gradually increasing time-series data in a storage medium of fixed capacity as statistical value data.

According to at least one embodiment described above, by the configuration in which the sections 11 to 15 are provided, it is possible to accumulate data in the data accumulation section 11 in a form in which data analysis taking an influence of old data into consideration without deleting old data can be executed.

It should be noted that it is also possible to distribute the method described in each of the above-mentioned embodiments by storing the method in a storage medium such as a magnetic disk (floppy (registered trade mark) disk, hard disk, and the like), optical disk (CD-ROM, DVD, and the like), magneto-optical disk (MO), semiconductor memory, and the like as a program which can be executed by a computer.

Further, regarding the storage medium, if the storage medium is capable of storing therein a program, and is a computer-readable storage medium, the storage medium may employ an arbitrary storage form.

Further, middleware (MW) operating on the computer on the basis of an instruction of a program installed from the storage medium onto the computer such as an operating system (OS), database-management software, network software, and the like may execute part of each of processing items configured to realize the aforementioned embodiments.

Furthermore, the storage medium in each of the embodiments is not limited to a medium independent of the computer, and a storage medium to which a program transmitted through a LAN or the Internet is downloaded, and in which the downloaded program is stored or is temporarily stored is also included in the above-mentioned storage medium.

Further, the number of storage media is not limited to one, even in the case where the processing in each of the above-mentioned embodiments is executed from a plurality of media, and each of the plurality of storage media is included in the storage medium in the present invention, and the invention may employ an arbitrary medium configuration.

It should be noted that the computer in each of the embodiments is configured to execute each of the processing items in each of the above-mentioned embodiments on the basis of the program stored in the storage medium, and may have any configuration such as a device constituted of a single device including a personal computer or the like, system in which a plurality of devices are network-connected, and the like.

Further, the computer in each of the embodiments is not limited to a personal computer, and an arithmetic processing unit included in an information processing apparatus, microcomputer, and the like are included in the above-mentioned computer, and "computer" is a general term for an apparatus, and device capable of realizing the functions of the present invention on the basis of a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A time-series data accumulation device comprising:
    a non-transitory storage unit which stores therein statistical value data indicating statistical values of time-series data indicating data varying with time;
    a determination unit which determines an interval function on the basis of data capacity indicating a data amount which is writable to the non-transitory storage unit, and a total amount of time elapsed from the beginning of measurement of the time-series data carried out by an external device configured to measure the time-series data;
    a first calculation unit which calculates an interval indicating an amount of time required by the external device to measure a set of time-series data items constituting one of the statistical value data on the basis of the determined interval function;
    a second calculation unit which acquires the set of time-series data items constituting the one of the statistical value data from the external device on the basis of the calculated interval, and thereafter calculates one of the statistical values on the basis of all the acquired time-series data items; and
    a write unit which writes the calculated statistical value to the non-transitory storage unit as the one of the statistical value data,
    wherein the interval function defines a gradient of the interval with respect to an elapsed time indicating an amount of time required by the external device from the beginning of measurement of the time-series data carried out by the external device to the beginning of measurement of the set of time-series data.

2. The time-series data accumulation device according to claim 1, wherein
the first calculation unit comprises a unit which calculates the interval on the basis of the determined interval function, and the elapsed time.

3. The time-series data accumulation device according to claim 1, wherein
the first calculation unit comprises a unit which calculates the interval on the basis of the determined interval function, and the order in which the one of the statistical value data items are to be stored in the non-transitory storage unit.

4. A time-series data accumulation device comprising:
a non-transitory storage unit which previously stores therein statistical value data indicating statistical values of time-series data indicating data varying with time, and a parameter used when the statistical values are calculated in such a manner that the statistical value data, and the parameter are correlated with each other;
a determination unit which determines an interval function on the basis of data capacity of a data amount which is writable to the non-transitory storage unit, and a total amount of time elapsed from the beginning of measurement of the time-series data carried out by an external device configured to measure the time-series data;
a first acquisition unit which acquires the parameter correlated with first statistical value data indicating one of the statistical value data from the non-transitory storage unit;
a first calculation unit which calculates an interval indicating an amount of time required by the external device to measure a first set of time-series data items constituting the first statistical value data on the basis of the determined interval function;
a second acquisition unit which acquires, when a value of the calculated interval satisfies a condition, the first statistical value data, and second statistical value data constituted of a second set of time-series data older than the first set of time-series data;
a second calculation unit which calculates a new statistical value on the basis of a plurality of statistical values indicated by the acquired first and second statistical value data items;
a first write unit which writes the statistical value data indicating the calculated new statistical value to the non-transitory storage unit; and
a second write unit which writes new time-series data measured by the external device to the non-transitory storage unit as new statistical value data,
wherein the interval function defines a gradient of the interval with respect to an elapsed time indicating an amount of time required by the external device from the beginning of measurement of the time-series data carried out by the external device to the beginning of measurement of the first set of time-series data.

5. The time-series data accumulation device according to claim 4, wherein
the first calculation unit comprises a unit which calculates the interval on the basis of the determined interval function, and the acquired parameter, and
the parameter is used when the statistical value indicated by the first statistical value data is calculated, and is the elapsed time.

6. The time-series data accumulation device according to claim 4, wherein
the first calculation unit comprises a unit which calculates the interval on the basis of the determined interval function, and the order in which the first statistical value data is stored in the non-transitory storage unit.

* * * * *